(12) United States Patent
Lin

(10) Patent No.: US 9,040,164 B2
(45) Date of Patent: May 26, 2015

(54) SELF-ASSEMBLED SILICA CONDENSATES

(75) Inventor: Jun Lin, Troy, MI (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 236 days.

(21) Appl. No.: 13/126,524

(22) PCT Filed: Jul. 28, 2009

(86) PCT No.: PCT/US2009/051940
§ 371 (c)(1),
(2), (4) Date: Apr. 28, 2011

(87) PCT Pub. No.: WO2010/065169
PCT Pub. Date: Jun. 10, 2010

(65) Prior Publication Data
US 2011/0207852 A1    Aug. 25, 2011

Related U.S. Application Data

(60) Provisional application No. 61/120,165, filed on Dec. 5, 2008.

(51) Int. Cl.
| | | |
|---|---|---|
| B32B 27/20 | (2006.01) |
| B32B 27/26 | (2006.01) |
| C09D 183/00 | (2006.01) |
| C08K 5/5415 | (2006.01) |
| C08K 5/5419 | (2006.01) |
| C08K 5/5435 | (2006.01) |
| C08K 5/5455 | (2006.01) |
| C09D 183/04 | (2006.01) |
| C08G 18/62 | (2006.01) |
| C09D 133/04 | (2006.01) |
| C09D 175/04 | (2006.01) |
| C08G 77/14 | (2006.01) |
| C08G 77/20 | (2006.01) |
| C08G 77/26 | (2006.01) |
| C08K 3/36 | (2006.01) |

(52) U.S. Cl.
CPC .......... *C09D 183/04* (2013.01); *C08G 18/6295* (2013.01); *C08G 77/14* (2013.01); *C08G 77/20* (2013.01); *C08G 77/26* (2013.01); *C08K 3/36* (2013.01); *C08L 2312/00* (2013.01); *C09D 133/04* (2013.01); *C09D 175/04* (2013.01)

(58) Field of Classification Search
None
See application file for complete search history.

(56) References Cited

U.S. PATENT DOCUMENTS

| | | | |
|---|---|---|---|
| 4,173,490 A | | 11/1979 | Rotenberg et al. |
| 4,525,421 A | * | 6/1985 | Kubota et al. .............. 428/412 |
| 4,614,766 A | | 9/1986 | Schimmel et al. |
| 4,652,470 A | * | 3/1987 | Das et al. .................. 427/407.1 |
| 5,747,590 A | | 5/1998 | Corcoran et al. |
| 5,780,530 A | * | 7/1998 | Mizutani et al. ............ 523/209 |
| 5,969,058 A | * | 10/1999 | Anderson et al. ........... 525/506 |
| 6,133,466 A | * | 10/2000 | Edelmann et al. .......... 556/440 |
| 6,140,445 A | | 10/2000 | Su et al. |
| 6,471,761 B2 | | 10/2002 | Fan et al. |
| 6,541,562 B1 | * | 4/2003 | Aoki et al. .................. 524/588 |
| 6,649,672 B1 | | 11/2003 | Ducoffre et al. |
| 7,070,859 B2 | | 7/2006 | Yoshihiko et al. |
| 2003/0041779 A1 | * | 3/2003 | Burger et al. ............. 106/287.14 |
| 2007/0134498 A1 | * | 6/2007 | Umeyama et al. ........... 428/413 |
| 2007/0292623 A1 | * | 12/2007 | Lin ............................ 427/407.1 |
| 2008/0160289 A1 | * | 7/2008 | Lin ............................ 428/327 |
| 2010/0159144 A1 | | 6/2010 | Standke et al. |

FOREIGN PATENT DOCUMENTS

WO    WO 2008078662 A1 *  7/2008    ............. C08L 83/04

* cited by examiner

*Primary Examiner* — Michael J Feely
(74) *Attorney, Agent, or Firm* — Ingrassia Fisher & Lorenz, P.C.

(57) ABSTRACT

Self-assembled silica condensates are described as well as their use in coating compositions. The self-assembled silica condensates can be formed from the hydrolysis of medium to long chain trialkoxy silane compounds. Coating compositions containing the self-assembled silica condensates can provide coatings having improved scratch and mar resistance and can have excellent recoat adhesion.

18 Claims, No Drawings

SELF-ASSEMBLED SILICA CONDENSATES

This a national stage (371) application of PCT/US09/51940, filed Jul. 28, 2009, which claims benefit to U.S. Provisional application No. 61/120,165, filed Dec. 5, 2008.

FIELD OF THE DISCLOSURE

This disclosure is related to self-assembled silica condensates and their use in coatings compositions. Also disclosed herein are methods for using the self-assembled silica condensates and coating composition containing the self-assembled silica condensates.

DESCRIPTION OF THE RELATED ART

The field of nanoparticles is a relatively new and growing area to the coatings industry. Nanoparticle materials are being utilized in many commercial coating applications and the benefits that they bring provide an increase in many important properties.

In the coatings industry, silica nanoparticles are one of the most important nanoscale materials and are commercially available in at least two different forms. Fumed silica is silicon dioxide that tends to become arranged in a chain-like structure. The manufacture of fumed silica is via the burning of silica tetrachloride in a hydrogen and oxygen flame. The chain-like structures are due to the agglomeration of the molten spheres of silicon dioxide. Colloidal silica is a water- or solvent-based dispersion of essentially spherical particles of silicon dioxide. Colloidal silica can be produced by several methods and is generally 3 to 7 times more expensive than fumed silica.

The addition of silica nanoparticles to coatings, especially to clearcoats, can provide an improvement in the scratch and mar resistance of the cured coating. Both fumed and colloidal silica can be used. Colloidal silica, having a high level of silanol groups on the surface, is more receptive to post treatment processes, which allows it to be dispersed into a coating composition more easily. If the colloidal silica is properly prepared, it can show improved jetness (color intensity) and better appearance, due to less agglomeration. However, colloidal silica tends to produce excessively high wear on circulation pumps and the price of colloidal silica can be prohibitive to its use in coatings.

Therefore, there is a continuing need for silica-containing coatings that offer high scratch and mar resistance, incorporate easily into coating compositions and do not cause wear issue for the circulation pumps used to apply the material to a substrate.

SUMMARY OF THE DISCLOSURE

The present disclosure relates to a coating composition comprising A) a self-assembled silica condensate; and B) a film-forming binder, substrates coated by the coating compositions and methods for producing a coating composition comprising the self-assembled silica condensates. The self-assembled silica condensate can be the hydrolysis reaction product of certain trialkoxy silanes with itself or other compounds or polymers that will be described.

The coating compositions containing the self-assembled silica condensates provide clearcoats that have excellent scratch and mar resistance.

DETAILED DESCRIPTION

As used herein, the phrase "self-assembled silica condensate" means a silicon containing material formed according to procedures described herein. The self-assembled silica condensate can comprise a variety of structures depending upon the components incorporated into the condensate, and can range from structures having a number average molecular weight of less than 1000 (oligomeric-type) to particles having an average particle size in the range of from 1 nanometer (nm) to 6 microns as measured by transmission electron microscopy (TEM) or light scattering.

As used herein, the term "hydrolysis reaction" or "hydrolysis" means that a mixture comprising or consisting essentially of the components (described later) are reacted in the presence of water, and wherein water reacts with at least one of the components to break existing covalent bonds and form new bonds. Optionally, an acid may be present during the reaction.

As used herein, the term 'substrate' means any surface made of materials such as metal, wood, resinous, asphalt, leather, paper, woven and nonwoven fabrics, metal, plaster, cement, paper, woven and nonwoven fabrics, metal, plaster or any other surface, whether or not the surface was previously coated with the same or different coating composition. Previous coatings include, but are not limited to electrodeposition primer, a primer, a primer/sealer, or a pigmented coating.

It should be noted that clearcoat refers to the state of the dried and cured coating. It is possible that a clearcoat composition can be a milky, transparent, opaque or translucent solution, mixture, or dispersion. Also, clearcoat compositions as described herein can optionally have a small amount of pigment present in order to tint the clearcoat composition.

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about". In this manner, slight variations above and below the stated ranges can be used to achieve substantially the same results as values within the ranges. Also, the disclosure of these ranges is intended as a continuous range including every value between the minimum and maximum values.

One embodiment of the following disclosure relates to a coating composition comprising A) a self-assembled silica condensate; and B) a film forming binder. The coating composition can be useful as a clearcoat composition and provides a layer of a dried and cured coating composition that can provide excellent scratch and mar resistance. In addition, the coating compositions described herein can also provide a substrate that adheres well to a subsequently applied layer of a coating composition, such as, for example, a layer of a coating applied during the repair of damaged portions.

Self-Assembled Silica Condensate

The self-assembled silica condensate can be formed from several hydrolysis methods as will be discussed below. In each of the embodiments of the hydrolysis, the hydrolysis is done in the presence of water and optionally, an acid catalyst can be added to the reaction to help accelerate the hydrolysis. Solvents are also optional.

Some suitable acid catalysts include aromatic sulfonic acids, such as, dodecylbenzene sulfonic acid, para-toluene sulfonic acid and dinonylnaphthalene sulfonic acid. Other acid catalysts that can be used include, for example, mineral acids, such as, hydrochloric acid, sulfuric acid, phosphoric acids; organic acids, such as, phenyl acid phosphate, benzoic acid; polymeric acid oligomers having pendant acid functional groups. Combinations of any of the above acid catalysts can also be used.

In some embodiments of the disclosure, the hydrolysis can be performed at ambient temperatures and in other embodiments, the hydrolysis reaction can be performed at elevated temperatures, up to the reflux temperature of the reaction mixture. In other embodiments, the hydrolysis reaction can be performed at temperatures in the range of from 30° C. to 90° C. In still further embodiments, the hydrolysis reaction can be performed at temperatures in the range of from 40° C. to 80° C. The length of time for the reaction can vary from several minutes to 24 hours or more.

In one embodiment, the self-assembled silica condensate can be formed by the hydrolysis of a reaction mixture comprising a medium to long chain trialkoxy silane. As used herein, the term "medium to long chain trialkoxy silane" means a compound having a structure according to formula (1):

$$(RO)_3-Si-R^1 \tag{1}$$

wherein each R is independently an alkyl group having from 1 to 4 carbon atoms; and $R^1$ is an organic group comprising 3 to 20 carbon atoms. $R^1$ can optionally include one or more functional groups, such as, for example, epoxide, carbamate, urea, isocyanate, hydroxyl, blocked isocyanate or a combination thereof. Suitable examples of medium to long chain trialkoxy silanes wherein $R^1$ includes one or more functional groups are represented by structures (2) and (3);

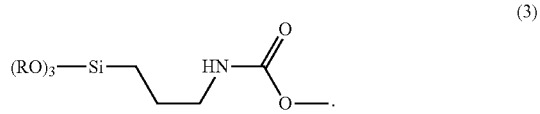

In some embodiments, the medium to long chain trialkoxy silane can be chosen from the group consisting of propyl trimethoxy silane, propyl triethoxy silane, isopropyl trimethoxy silane, isopropyl triethoxy silane, 1-butyl trimethoxy silane, 1-butyl triethoxy silane, 2-butyl trimethoxy silane, 2-butyl triethoxy silane, isobutyl trimethoxy silane, isobutyl triethoxy silane, t-butyl trimethoxy silane, t-butyl triethoxy silane, 1-pentyl trimethoxy silane, 1-pentyl triethoxy silane, isomers of pentyl trimethoxy silane, isomers of pentyl triethoxy silane, 1-hexyl trimethoxy silane, 1-hexyl triethoxy silane, isomers of hexyl trimethoxy silane, isomers of hexyl triethoxy silane, octyl trimethoxy silane, octyl triethoxy silane and a combination thereof.

It has been found that self-assembled silica condensates formed during the hydrolysis of medium to long chain trialkoxy silane (1) wherein $R^1$ is unsubstituted alkyl, i.e. propyl, butyl, etc, tend to form silica condensates that are surface active. By "surface active" is meant that the silica condensate, when formulated as a component of a coating composition, tend to disperse to the surface region of a layer of the applied coating. While not all of the silica condensates migrate to the surface, the coating composition will have a graduated concentration of silica condensates with a relatively lower concentration at the surface next to the substrate and a relatively higher concentration at the surface opposite to the substrate.

In one embodiment, this surface activity can be determined using Electron Spectroscopy for Chemical Analysis (ESCA) to determine the elemental silicon concentration in the surface region versus the theoretical concentration of elemental silicon in the bulk of the material. ESCA utilizes X-Rays with low energy, typically 1-2 keV, to knock off photoelectrons from atoms of the sample through the photoelectric effect. The energy content of these ejected electrons are then analyzed by a spectrometer to identify the elements they came from.

Cured coating compositions having a relatively high concentration of silica condensates near the surface tend to have excellent scratch and mar resistance. However, such coatings also tend to have poor recoat adhesion. In addition, over time, the surface layer can be worn away due to certain mechanical actions (for example, washing) and the layer containing the silica condensates can be removed. After the layer of coating having a relatively high concentration of silica condensates dispersed therein has been removed, the scratch and mar resistance benefits are decreased when compared to that of the initial coating.

Self-assembled silica condensates that are formed from the hydrolysis of medium to long chain trialkoxy silane (1) wherein $R^1$ includes one or more functional groups, tend to remain well dispersed throughout the bulk of the layer of a dried and cured coating. Dispersion of the self-assembled silica condensates throughout the bulk of the layer of dried and cured coating composition provides consistent scratch and mar resistance even when the surface region has been removed. Recoat adhesion of a damaged portion of the coating is also not impacted in a negative manner.

In a second embodiment, the self-assembled silica condensate can be produced by the hydrolysis of a mixture comprising at least two medium to long chain trialkoxy silanes (1). The mixture can comprise at least one medium to long chain trialkoxy silane, wherein $R^1$ is an alkyl group, and at least one medium to long chain trialkoxy silane wherein $R^1$ is substituted with a functional group, such as, for example, wherein $R^1$ is substituted with an epoxy or a carbamate group, as in structures (2) or (3).

The ratio of substituted to unsubstituted $R^1$ can vary. Suitable self-assembled silica condensates can be produced when 100% of the medium to long chain trialkoxy silane includes one or more functional groups. Other suitable embodiments can be produced when the ratio of substituted $R^1$ to unsubstituted $R^1$ is in the range of from 0.01:100 to greater than 100:0.01.

In a third embodiment, the self-assembled silica condensates can be formed by the hydrolysis of a mixture comprising medium to long chain trialkoxy silane and tetraalkoxy orthosilicate. The tetraalkoxy orthosilicate can be present in the reaction mixture in a trialkoxy silane:orthosilicate ratio in the range of from 1:0.01 up to about 1:20 or higher. It is known that, under certain conditions, the hydrolysis of tetraalkoxy orthosilicate can result in gel formation and therefore care should be taken to avoid formation of gels if that result is not desirable.

In some embodiments, the tetraalkoxy orthosilicate can include tetramethoxy orthosilicate, tetraethoxy orthosilicate, tetrapropyl orthosilicate and a combination thereof.

In a fourth embodiment, the self-assembled silica condensates can be produced by the hydrolysis of a mixture comprising or consisting essentially of medium to long chain trialkoxy silane and silane functional polymers. Optionally, tetraalkoxy orthosilicates can be added as reactants.

Suitable silane functional polymers can have at least one functional group that is a hydrolysable silane functional group of the formula Si—X; wherein X is an alkoxy group having from 1 to 4 carbon atoms, an aryloxy group having from 6 to 20 carbon atoms, an acyloxy group having from 2 to 6 carbon atoms, hydrogen, halogen, hydroxy, amide, amide, imidazole, oxazolidinone, urea, carbamate and hydroxylamine. The hydrolysable silane functional group can be at the terminal ends of the polymer chain, part of the main polymer chain, or it can be pendant to the main polymer chain.

In some embodiments, the silane functional polymer can also contain at least one hydroxy functional group. The hydroxy functional group can help to provide the self-assembled silica condensate with crosslinkable functional groups that can interact with a crosslinking component (discussed below) to form a part of the crosslinked network of the layer of dried and cured coating composition and also provide for improved recoat adhesion.

Some suitable silane functional polymers can include, for example, KC-89S, a partially hydrolyzed methylmethoxy polysiloxane, available from Shin-Etsu Silicones of America, Inc., Akron, Ohio; silane functional polyacrylates; silane and hydroxy functional polyacrylates; reaction products of oligomeric polyols of linear, star or branched aliphatic polyesters or polyethers with γ-isocyanatopropyltriethoxylsilane or γ-isocyanatopropyltrimethoxylsilane; hydrosilated vinyl containing oligomers.

In a fifth embodiment, the self-assembled silica condensates can be formed by any of the above methods with the further addition of colloidal silica to the hydrolysis reaction. In this fifth embodiment, the reaction mixture consists essentially of any one of the previously mentioned reactant mixtures and colloidal silica. The addition of colloidal silica can help to stabilize the self-assembled silica condensates against flocculation and eventually settling out. It has been found that the certain types of self-assembled silica condensates, when formed without the presence of colloidal silica, can, over time, settle out. Formation of the self-assembled silica condensates in the presence of colloidal silica reduces the settling out.

The hydrolysis methods described above can result in self-assembled silica condensates having an average molecular weight of less than 1000 grams/mole up to self-assembled silica condensates with an average particle size in the range of from 1 nm to 2000 nm. In general, the described hydrolysis methods result in a product having a mixture of products within the size ranges above. One of ordinary skill in the art can modify the reaction conditions to favor lower molecular weight products or to favor larger self-assembled silica condensates.

Self-assembled silica condensates formed according to the above described methods are readily dispersed in coating compositions. These coating compositions can provide a layer of a dried and cured coating that has the self-assembled silica condensates dispersed throughout the bulk of the coating, or, by varying the ratio of substituted to unsubstituted $R^1$ of the medium to long chain trialkoxy silane, a coating composition can be produced having self-assembled silica condensates dispersed throughout the bulk material and also having a relatively higher concentration of the silica condensates at the surface.

For the purpose of determining the amount of self-assembled silica condensate to add to a coating composition, it is assumed that all of the starting materials, with the exception of the optional acid catalysts and optional solvents, form the desired product. Depending upon the reaction conditions, reagent reactivities and various other factors the reaction may or may not approach 100 percent of the initial starting materials participating in the hydrolysis reaction. Reaction of all of the starting materials is irrelevant for the calculation of the amount of self-assembled silica condensate added to the coating composition, as was stated previously, it is to be assumed that all of the starting materials, with the exception of the optional acid catalysts and optional solvents form the desired product.

Film Forming Binder

The coating composition can comprise self-assembled silica condensates and film-forming binder. The coating composition can contain the self-assembled silica condensate in the range of from 1 to 30 percent based on the total weight of the film-forming binder. Typical coating compositions can include, in addition to the self-assembled silica condensate and film-forming binder, solvents, pigments, rheology control agents, light stabilizers, UV absorbers, crosslinking catalysts and other additives.

The term "film-forming binder" means those components that form a part of the final crosslinked network. Other ingredients typically added to coating compositions that form a part of the dried layer, but do not become an integral part of the crosslinked network are not considered part of the film-forming binder. Also excluded in this definition are the added self-assembled silica condensates formed by any of the previously described methods.

Coating compositions comprising the self-assembled silica condensates can be formed by any of the known methods. In one embodiment, a clearcoat composition can be formed by mixing together all of the ingredients of the coating composition except for the self-assembled silica condensate. Following the mixing of all of these ingredients, the self-assembled silica condensate can be added and mixed to form the coating composition. In another embodiment, the self-assembled silica condensate can be mixed together with all of the ingredients to form the coating composition. In a further embodiment, especially in the case of the crosslinking component being an unblocked polyisocyanate, the self-assembled silica condensate can be mixed with one or the other or both of the separate crosslinking and crosslinkable components. The separate crosslinking and crosslinkable components can then be mixed just prior to using to form a "pot mix" that can be applied to the substrate.

Optionally, moisture scavengers can be added to the coating compositions containing the self-assembled silica condensates. In some embodiments, the moisture scavenger can be trimethyl orthoacetate. Other moisture scavengers are known in the art and may be used.

The film-forming binder comprises or consists essentially of a crosslinkable component and a crosslinking component. The crosslinkable component can be a compound, oligomer and/or polymer having functional groups that are capable of reacting with functional groups on the crosslinking component to form a crosslinked network. The crosslinkable functional groups can include, for example, hydroxyl groups, amine groups, epoxy groups, carboxylic acid groups, anhydride groups, aspartate groups, acetoacetoxy groups, orthoester groups, thiol groups or a combination thereof. The crosslinking component can be a compound, oligomer and/or polymer that has functional groups that are capable of reacting with the functional groups of the crosslinkable component to form a crosslinked network. The crosslinking functional groups can include carboxylic acid groups, anhydride groups, isocyanate groups and blocked isocyanate groups. Melamine resins are also suitable as the crosslinkable component. Combinations of any of the aforementioned crosslinking components can be used.

In one embodiment, the crosslinkable component is a compound, oligomer and/or polymer containing epoxy functional groups and the crosslinking component is a compound, oligomer and/or polymer containing carboxylic acid groups. These coatings are typically called "epoxy/acid" coating compositions and are well-known in the art. As used herein, the term "carboxylic acid groups" includes carboxylic acid and/or anhydride functional groups. In some embodiments, a single compound, oligomer and/or polymer can have both epoxy and carboxylic acid groups.

Typical crosslinkable components containing epoxy functional groups can be chosen from epoxy functional acrylic polymers, epoxy functional polyester polymers, epoxy functional polyethers, epoxy functional polyurethanes or a combination thereof. Such polymers can have epoxy equivalent weight in the range of from 100 to 2000 grams per mole. As used herein, epoxy equivalent weight means the weight of resin, in grams, that contains one equivalent of epoxy.

Typical polymers containing carboxylic acid groups can be chosen from acrylic polymers, polyester polymers, polyethers, polyurethanes or a combination thereof. Such polymers can have acid equivalent weights in the range of from 100 to 2000 grams per mole.

In other embodiments, the crosslinkable component comprises compounds, oligomers and/or polymers having crosslinkable groups such as, for example, hydroxyl groups, amine groups, carboxylic acid groups, anhydride groups, aspartate groups, acetoacetoxy groups, orthoester groups, thiol groups or a combination thereof and the crosslinking component comprises compounds, oligomers and/or polymers comprising isocyanate groups; blocked isocyanate groups; melamine resins or combinations thereof.

The compounds, oligomers and/or polymers having hydroxyl, amine, carboxylic acid, anhydride, aspartate, acetoacetoxy, orthoester and/or thiol groups are well-known in the art. Typical compounds, oligomers and/or polymers containing these groups can include, for example, polyacrylates, polyesters, polyethers, polyurethanes and combinations thereof.

The compounds, oligomers and/or polymers having crosslinkable groups are often referred to as the crosslinkable component of a film forming binder. For the crosslinkable groups to form a durable film, they must be reacted, or crosslinked, with a crosslinking component. Compounds, oligomers and/or polymers having isocyanate functional groups can function as the crosslinking component of the film forming binder.

Typical isocyanate crosslinking components include, for example, aliphatic, cycloaliphatic and aromatic polyisocyanates. Specific examples can include; 2,4-toluene diisocyanate, 2,6-toluene diisocyanate, 4,4-diphenylmethane diisocyanate, 4,4'-dicyclohexyl methane diisocyanate, 3,3'-dimethyl-4,4'-biphenyl diisocyanate, 1,4-benzene diisocyanate, 1,5-naphthalene diisocyanate, 1,6-hexamethylene diisocyanate (HDI), 4,6-xylene diisocyanate, isophorone diisocyanate (IPDI), 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-4,4'-dicyclohexylmethane diisocyanate, polyisocyanates having isocyanurate structural units, polyisocyanates having uretidione structural units, adducts of 3 molecules of diisocyanates and 1 molecule of water, allophanates, uretidiones, trimers and biurets, for example, of hexamethylene diisocyanate, allophanates, uretidiones, trimers and biurets, for example, of isophorone diisocyanate. 1,6-hexamethylene diisocyanate and isophorone diisocyanate and isocyanurates thereof are preferred because of their commercial availability. Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate, sold as TOLONATE® HDT from Rhodia Corporation and the trimer of isophorone diisocyanate are also suitable. Combinations of any of the mentioned polyisocyanates are also useful. The use of aromatic polyisocyanates in coating compositions can lead to a yellowing of the coating over time. Therefore, the use of aromatic polyisocyanates should be carefully considered when the coating composition is to be used as a clearcoat composition.

In some embodiments, the crosslinking component is selected from the group consisting of hexamethylene diisocyanate, isophorone diisocyanate, isocyanurates of hexamethylene diisocyanate, allophanates of hexamethylene diisocyanate, biurets of hexamethylene diisocyanate, uretidiones of hexamethylene diisocyanate, isocyanurates of isophorone diisocyanate, allophanates of isophorone diisocyanate, biurets of isophorone diisocyanate, uretidiones of isophorone diisocyanate and a combination thereof.

Any of the above polyisocyanates can optionally be blocked with known blocking agents, according to known methods to form blocked polyisocyanates. Such blocked polyisocyanates can be used as the crosslinking component in a coating composition containing the self-assembled silica condensate.

Melamine resin crosslinking components are generally fully or partially alkylated melamine formaldehyde compounds and may be monomeric or polymeric or mixtures thereof. Some of the suitable melamines include melamines which contain, on average, three or more methylol groups etherized with monohydric alcohols having from 1 to 5 carbon atoms, such as, for example, methanol, n-butanol, or isobutanol per triazine nucleus.

Many suitable melamines are commercially available and can include alkylated melamines, such as, methylated, butylated, isobutylated melamines and mixtures thereof. Suitable melamine resins are available from Cytec Industries Inc., West Patterson, N.J., and from Ineos Melamines, Marietta, Ga.

If desired, appropriate catalysts may also be included to accelerate the crosslinking process of the coating composition.

When the coating compositions include a polyisocyanate or a blocked polyisocyanate as the crosslinking agent, the coating composition preferably includes a catalytically active amount of one or more tin or tertiary amine catalysts for accelerating the curing process. Generally, the catalytically active amount of the catalyst in the coating composition ranges from about 0.001 percent to about 5 percent, preferably ranges from 0.005 percent to 2 percent, more preferably, ranges from 0.01 percent to 1 percent, all in weight percent based on the weight of the film-forming binder. A wide variety of catalysts can be used, such as, tin compounds, including dibutyl tin dilaurate and dibutyl tin diacetate; tertiary amines, such as, triethylenediamine. These catalysts can be used alone or in conjunction with carboxylic acids, such as, acetic acid. One of the commercially available catalysts, sold under the trademark, FASTCAT® 4202 dibutyl tin dilaurate by Elf-Atochem North America, Inc. Philadelphia, Pa., is particularly suitable.

When the coating compositions include melamine as the crosslinking agent, it also preferably includes a catalytically active amount of one or more acid catalysts to further enhance the crosslinking of the components on curing. Generally, catalytically active amount of the acid catalyst in the coating composition ranges from about 0.1 percent to about 5 percent, preferably ranges from 0.1 percent to 2 percent, more preferably ranges from 0.5 percent to 1.2 percent, all in weight percent based on the weight of the binder. Some suitable acid catalysts include aromatic sulfonic acids, such as, dodecylbenzene sulfonic acid, para-toluenesulfonic acid and dinonylnaphthalene sulfonic acid, all of which are either unblocked or blocked with an amine, such as, dimethyl oxazolidine and 2-amino-2-methyl-1-propanol, n,n-dimethylethanolamine or a combination thereof. Other acid catalysts that can be used, such as phosphoric acids, more particularly, phenyl acid phosphate, benzoic acid, oligomers having pendant acid groups, all of which may be unblocked or blocked with an amine.

The coating composition can comprise an organic solvent or blend of solvents. The selection of organic solvent depends upon the requirements of the specific end use application of the coating composition, such as, for example, the VOC emission requirements, the selected pigments, film forming binder and crosslinking agents.

Representative examples of organic solvents which can be useful herein include alcohols, such as, methanol, ethanol, n-propanol, isopropanol and butanol; ketones, such as, acetone, butanone, pentanone, hexanone, and methyl ethyl ketone, methyl isobutyl ketone, diisobutyl ketone, methyl amyl ketone; alkyl esters of acetic, propionic, and butyric acids, such as, ethyl acetate, butyl acetate, and amyl acetate; ethers, such as, tetrahydrofuran, diethyl ether, and ethylene glycol and polyethylene glycol monoalkyl and dialkyl ethers, such as, cellosolves and carbitols; and glycols, such as, ethylene glycol and propylene glycol and mixtures thereof, and aromatic hydrocarbon solvents, such as, xylene, toluene.

To improve weatherability of the composition about 0.1-10% by weight, based on the weight of the film forming binder, of ultraviolet light stabilizers, screeners and antioxidants can be added. Typical ultraviolet light screeners and stabilizers include the following:

Benzophenones, such as, for example, hydroxy dodecyloxy benzophenone, 2,4-dihydroxy benzophenone, hydroxy benzophenones containing sulfonic acid groups or combinations thereof.

Benzoates, such as, for example, dibenzoate of diphenylol propane, tertiary butyl benzoate of diphenylol propane or combinations thereof.

Triazines, such as, for example, 3,5-dialkyl-4-hydroxyphenyl derivatives of triazine, sulfur containing derivatives of dialkyl-4-hydroxy phenyl triazine, hydroxy phenyl-1,3,5-triazine or combinations thereof.

Triazoles, such as, for example, 2-phenyl-4-(2,2'-dihydroxy benzoyl)-triazole, substituted benzotriazoles such as, for example, hydroxy-phenyltriazole or combinations thereof.

Hindered amines, such as, for example, bis(1,2,2,6,6 entamethyl-4-piperidinyl sebacate), di[4(2,2,6,6,tetramethyl piperidinyl)]sebacate or combinations thereof; and mixtures of any of the above.

Generally, rheology control agents can be used in the composition in amounts of about 0.1-5% by weight, based on the weight of the film forming binder, such as, for example, polyacrylic acid, polyalkylacrylates, polyether modified dimethyl polysiloxane copolymer, polyester modified polydimethyl siloxane or a combination thereof.

In one embodiment, the coating composition is used as a clearcoat in automotive finishing and in refinishing vehicles. Small amounts of pigments may be added to a clearcoat composition to tint the clearcoat and provide enhanced aesthetic effects. In other embodiments, the coating composition can contain pigments to provide a mono coat, basecoat, sealer coat, primer, primer surfacer or other pigmented coating composition. Pigments can be added to the coating composition in a pigment to binder ratio of about 0.1:100 to 300:100 as are commonly used for the aforementioned compositions. Pigments typically are formulated into mill bases compatible with the coating composition and are added in the desired amount. Pigments used are those that are typically used for the aforementioned compositions and are well known to those skilled in the art.

In some embodiments, the coating composition can be prepared as a "one-pack coating composition" which means a curable coating composition having both the crosslinkable component and the crosslinking agent stored together in one pack. One-pack coating compositions are applied to a suitable substrate and are typically cured at elevated temperatures to form a durable coating.

In other embodiments, the coating composition can be prepared as a "two-component" or "two-pack" coating compositions, wherein the crosslinkable components and the crosslinking agents are stored in separate containers, which are typically sealed. The catalyst, organic solvent, and usual other additives may be added to either or both the crosslinkable or crosslinking agents, depending upon the intended use of the composition. However, these additives (except for some solvent) are preferably added to and stored in the same container with the crosslinkable component. The contents of the component containers are mixed in the desired ratio just prior to use to form the activated coating composition, which has a limited pot life. Mixing is usually accomplished simply by stirring at room temperature just before application. The coating composition is then applied as a layer of desired thickness on a substrate surface, such as an autobody. After application, the layer dries and cures at ambient or elevated temperatures to form a coating on the substrate surface having the desired coating properties.

In the application of the coating composition as a clearcoat refinish to a vehicle such as an automotive or a truck, a basecoat which may be either a solventborne composition or a waterborne composition is first applied and then dried to remove at least a portion of the solvent or water before the clearcoat is applied, usually wet-on-wet by conventional spraying. When the applied basecoat composition is a waterborne basecoat composition, the drying step should remove at least 75% of the water from the applied layer. Electrostatic spraying also may be used. In refinish applications, the composition is preferably dried and cured at ambient temperatures but can be forced dried and cured in paint booths equipped with heat sources at slightly elevated booth temperatures of, in general, about 30-100° C., preferably, about 35-65° C., for a short time of about 3-30 minutes, preferably about 5-15 minutes. The coating so formed is typically about 0.5-5 mils thick.

Preferred substrates are automotive vehicle (or automobile) bodies, any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, boats, and aircraft. The substrate further includes industrial and commercial new construction and maintenance thereof; cement and wood floors; walls of commercial and residential structures, such office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods (including uni-, bi-, tri-, and motorcycles); and sporting equipment.

EXAMPLES

The chemicals used herein are available from the Aldrich Chemical Company, unless otherwise noted.

VAZO® 67 initiator, available from DuPont, Wilmington, Del.

KC-89S® methylmethoxy polysiloxane is available from Shin-Etsu Silicones of America, Inc., Akron, Ohio IPA-ST® colloidal silica is available from Nissan Chemical Industries, Ltd., Houston, Tex.

EXXSOL® D-3135 petroleum naphtha is available from ExxonMobil, Houston, Tex.

EXXSOL® D40 mineral spirits is available from ExxonMobil, Houston, Tex.

RESIMENE® 717 and 755 melamines are available from INEOS Melamines, Inc., Marietta, Ga.

CYMEL® 1168 monomeric melamine supplied by Cytec Industries Inc., West Patterson, N.J.

TINUVIN® 123 and 928 light stabilizers are supplied by Ciba Specialty Chemicals, Tarrytown, N.Y.

Dodecyl benzene sulfonic acid and the 2-amino-2-methyl-1-propanol salt of dodecyl benzene sulfonic acid are supplied by King Industries, Norwalk, Conn. under the NACURE® brand name.

DISPARLON® LC-955 flow aid supplied by King Industries, Norwalk, Conn.

Trimethyl orthoacetate and butanol are supplied by Chem Central, Bedford Park, Ill.

AROMATIC® 100 hydrocarbon fluid is available from ExxonMobil, Houston, Tex.

The following abbreviations are used herein
HPA—Hydroxypropyl acrylate
HEMA—2-hydroxyethyl methacrylate
MAPTS—Methacryloxypropyl trimethoxy silane
Sty—Styrene
IBMA—Isobutyl methacrylate
BA—Butyl acrylate
BMA—Butyl methacrylate
EHA—2-Ethyl hexyl acrylate Preparation of Acrylic Hydroxy Functional Silane Polymers 1 and 2

Silane polymers 1 and 2 were prepared by copolymerizing in the presence of a 2/1 SOLVESSO® 100 aromatic solvent/butanol mixture, the monomer mixtures described in Table 1 in the presence of 8 parts by weight of VAZO® 67 initiator. The resulting polymer solution has a 70% solids content and a viscosity of F—R on the Gardner Holdt scale measured at 25° C. and the polymers have a weight average molecular weight of approximately 4,500 gram/mole. All amounts in Table 1 are parts by weight.

TABLE 1

|  | Silane Polymer 1 | Silane Polymer 2 |
| --- | --- | --- |
| HPA | 20 |  |
| HEMA |  | 31.5 |
| MAPTS | 30 | 10 |
| Sty | 25 | 20 |
| IBMA | 23 |  |
| BA | 2 |  |
| BMA |  | 25.9 |
| EHA |  | 12.6 |

Preparation of Self-assembled Silica Condensates 1-8

Preparation of Self-Assembled Silica Condensate 1

30 grams of propyltrimethoxysilane, 19.1 grams of tetraethyl orthosilicate, 8.3 grams of deionized water and 0.36 grams of dodecylbenzene sulfonic acid were added to a flask with stirring. The mixture was stirred for several minutes until a clear solution was formed. The mixture was then stirred at 60° C. for 15 hours. To this mixture, 10 grams of silane polymer 1 was added and continue to mix at 60° C. for another 15 hours.

Preparation of Self-Assembled Silica Condensate 2

8 grams of propyltrimethoxysilane, 40 grams of tetraethyl orthosilicate, 8.3 grams of deionized water and 0.36 grams of dodecylbenzene sulfonic acid were added to a flask with stirring. The mixture was stirred for several minutes until a clear solution was formed. The mixture was then stirred at 60° C. for 15 hours. To this mixture, 4 grams of KC-89S and 8 grams of silane polymer 2 were added and continue to mix at 60° C. for another 15 hours.

Preparation of Self-Assembled Silica Condensate 3

30 grams of propyltrimethoxysilane, 19.1 grams of tetraethyl orthosilicate, 8.3 grams of deionized water and 0.36 grams of dodecylbenzene sulfonic acid were added to a flask with stirring. The mixture was stirred for several minutes until a clear solution was formed. To this mixture, 4.9 grams of IPA-ST were added and stirred at 60° C. for 15 hours. To this heated resultant mixture, 9 grams of silane polymer 2 was added and continue to mix at 60° C. for another 15 hours.

Preparation of Self-Assembled Silica Condensate 4

7.2 grams of propyltrimethoxysilane, 36 grams of tetraethyl orthosilicate, 10.6 grams of deionized water and 0.36 grams of dodecylbenzene sulfonic acid were added to a flask with stirring. The mixture was stirred for several minutes until a clear solution was formed. To this mixture, 4.7 grams of IPA-ST were added and stirred at 60° C. for 15 hours. The mixture was then stirred at 60° C. for 15 hours. To this mixture, 4 grams of KC-89S and 8 grams of silane polymer 2 were added and continue to mix at 60° C. for another 15 hours.

Preparation of Self-Assembled Silica Condensate 5

51.8 grams of gamma-glycidoxypropyltrimethoxysilane, 5.9 grams of deionized water and 0.36 grams of phenyl acid phosphate were added to a flask with stirring. The mixture was stirred for several minutes until a clear solution was formed. The mixture was then stirred at 60° C. for 15 hours.

Preparation of Self-Assembled Silica Condensate 6

10.8 grams of propyltrimethoxysilane, 36.2 grams of gamma-glycidoxypropyltrimethoxysilane, 5.9 grams of deionized water and 0.36 grams of phenyl acid phosphate were added to a flask with stirring. The mixture was stirred for several minutes until a clear solution was formed. The mixture was then stirred at 60° C. for 15 hours.

Preparation of Self-Assembled Silica Condensate 7

7.7 grams of propyltrimethoxysilane, 25.9 grams of gamma-glycidoxypropyltrimethoxysilane, 7 grams of deionized water, 16.3 grams of tetraethyl orthosilicate and 0.36 grams of dodecylbenzylsulfonic acid were added to a flask with stirring. The mixture was stirred for several minutes until a clear solution was formed. The mixture was then stirred at 60° C. for 15 hours. To the above mixture, 7.5 grams of gamma-glycidoxypropyltrimethoxysilane were added and continued to stir for another 15 h at 60° C.

Preparation of Self-Assembled Silica Condensate 8

7.7 grams of propyltrimethoxysilane, 25.9 grams of gamma-glycidoxypropyltrimethoxysilane, 7 grams of deionized water, 16.3 grams of tetraethyl orthosilicate and 0.36 grams of dodecylbenzylsulfonic acid were added to a flask with stirring. The mixture was stirred for several minutes until a clear solution was formed. To this mixture, 5.7 grams of IPA-ST was added and the resulting mixture was then stirred at 60° C. for 15 hours. Above mixture was further treated with 8.5 grams of gamma-glycidoxypropyltrimethoxysilane and further heated for 15 h at 60° C.

Preparation of Non-Aqueous Dispersion (NAD)

To a 5-liter flask equipped with an agitator, thermometer, condenser, nitrogen inlet and addition funnels was added 206 parts of a random copolymer comprising styrene/butyl acrylate/butyl methacrylate/2-hydroxy ethyl acrylate/methacrylic acid/glycidyl methacrylate (14.7/43.6/27.5/10.1/2.3/1.7, in parts by weight), 12 parts of isopropanol, 94 parts of mineral spirits, 53 parts of heptane and 3 parts of butanol. The random copolymer was 63.5% by weight in toluene having a weight average molecular weight of 8100. The mixture was agitated under a nitrogen atmosphere and was heated to reflux (100° C. to 104° C.). A mixture of 0.5 parts t-butyl peroctoate in 5 parts mineral spirits was added all at once. A mixture of 52 parts styrene, 86 parts of 2-hydroxy ethyl acrylate, 126 parts methyl methacrylate, 5 parts of glycidyl methacrylate, 14 parts methacrylic acid, 62 parts methyl acrylate and 103 parts of the previously described random copolymer was added to the refluxing mixture over a 210 minute period. When the addition was complete, a mixture of 12 parts butanol, 17 parts heptane, 5 parts t-butyl peroctoate and 31 parts mineral spirits was added and the mixture was refluxed for 45 minutes. A mixture of 1.7 parts t-butyl peroctoate in 16 parts of butanol was then added over a 30 minute period and the reaction was held for 60 minutes. Finally, the reactor was stripped of 76 parts of solvent. The reaction had a room temperature viscosity of 2000 centipoise at 5 rpm on a Brookfield viscometer and a weight solids of 63.5 percent.

Clearcoat Composition

Preparation of Clearcoat Common

Clearcoat composition 1 was prepared by blending together the following ingredients in the order given. All ingredients amounts are in parts by weight.

TABLE 2

|  | Clearcoat common |
| --- | --- |
| CYMEL ® 1168 | 97 |
| RESIMENE ® 717 | 36 |
| TINUVIN ® 123 | 5.6 |
| TINUVIN ® 928 | 11 |
| NAD | 222 |
| Catalyst[1] | 14 |
| DISPARLON ® LC-955 | 6 |
| Trimethyl orthoacetate | 15 |
| Silane Polymer 1 | 383 |
| Butanol | 50 |

[1]Dodecylbenzene sulfonic acid salt of 2-amino-2-methyl-1-propanol.

Preparation of Control Clearcoat 1 and Clearcoats 2-5

Control clearcoat 1 and clearcoat examples 2-5 were prepared by mixing 190 grams of the clearcoat common with the ingredients shown in Table 3. All amounts in table 3 are in grams.

TABLE 3

|  | Control Clearcoat 1 | Clearcoat 2 | Clearcoat 3 | Clearcoat 4 | Clearcoat 5 |
| --- | --- | --- | --- | --- | --- |
| Clearcoat composition 1 | 190 | 190 | 190 | 190 | 190 |
| Silane Polymer 1 | 10 |  |  |  |  |
| Self-assembled silica condensate 1 |  | 19.5 |  |  |  |
| Self-assembled silica condensate 2 |  |  | 19.5 |  |  |
| Self-assembled silica condensate 3 |  |  |  | 19.5 |  |
| Self-assembled silica condensate 4 |  |  |  |  | 19.5 |

Control clearcoat 1 and clearcoats 2-5 were reduced to a spray viscosity of 35 seconds on a Ford #4 cup at room temperature with AROMATIC® 100 and each was hand sprayed to a thickness of about 50 microns onto a panel coated with a solvent-borne black base-coat over a steel substrate which was already coated with a layer each of electrocoat and primer surfacer. The water-borne basecoat is an Ebony basecoat commercially available from DuPont under DuPont Code of 562561222. The primer surfacer used is commercially available from DuPont under DuPont Code of 554-DN082. The electrocoat used is commercially available from DuPont under the name of ED5050.

The basecoats were applied in two coats by hand with a 60 second flash period between the first and the second coat over a primed, electrocoated steel substrate. The spray booth conditions were 24° C. and 65% humidity. After a 5-minute heated flash at 70° C., following the second basecoat application, two layers of the clearcoat compositions with a 30 second flash between the first and the second clearcoat application. The booth conditions remained the same. The clearcoats were further flashed for 10 minutes and then baked in an oven for 20 minutes at 140° C.

For scratch and mar resistance tests, the panels were allowed to age for at least 24 hours. The properties of coatings were measured and reported in the following Table 6. It is important to note that the mar tests can be sensitive to ambient conditions. It is therefore good practice to run a control experiment each time an experiment is conducted to form an accurate baseline with which to judge the mar tests.

Crockmeter—Dry Mar Resistance

The clearcoating of the panel was coated with a thin layer of Bon Ami abrasive supplied by Faultless Starch/Bon Ami Corporation, Kansas City, Mo. The panels were then tested for mar damage by applying 10 double rubs against a green felt wrapped fingertip of A.A.T.C.C. Crockmeter (Model CM-1, Atlas Electric Devices Corporation, Chicago, Ill.). The dry mar resistance was recorded as percentage of gloss retention by measuring the 20° gloss of the mar areas versus the non-marred areas of the coated panels.

Crockmeter-Wet Mar Resistance

Similar procedure was used as above except that a wet alumina slurry was used instead of the Bon Ami abrasive. The alumina slurry consisted of 294 parts deionized water, 21 parts ACRYSOL® ASE-60 Thickener (available from Rohm & Haas, Philadelphia, Pa.), 25 parts of a 95% aqueous solution of amino methyl propanol and 7 parts of aluminum oxide (120# grit)

The data is summarized in Table 4.

TABLE 4

|  | 20° Gloss | 2° Haze | Crockmeter - Dry Mar | Crockmeter - Wet Mar |
| --- | --- | --- | --- | --- |
| Control clearcoat 1 | 88 | 0.09 | 90% | 68% |
| Clearcoat 2 | 88 | 0.1 | 90% | 90% |
| Clearcoat 3 | 88 | 0.1 | 84% | 90% |
| Clearcoat 4 | 88 | 0.1 | 90% | 90% |
| Clearcoat 5 | 88 | 0.1 | 95% | 80% |

As Table 6 shows, clearcoats 2-5 all showed significant improvement of wet mar resistance over the control which was inferior. The dry mar resistance of control was acceptable, but could be further improved as shown in clearcoat 5.

Preparation of Control Clearcoat 6 and Clearcoats 7-10

An epoxy-acid based clearcoat (Kino 1200th clearcoat, RK-8139, commercially available from DuPont, Wilmington, Del.) was reduced with 10% wt of 1/1 mixture of AROMATIC® 100 and DBE dibasic ester mixture and used as a control clear. To this epoxy-acid control clear was added the self-assembled silica condensate to make the clear compositions described in Table 5. All amounts in table 5 are in grams.

TABLE 5

|  | Control clearcoat 6 | Clearcoat 7 | Clearcoat 8 | Clearcoat 9 | Clearcoat 10 |
| --- | --- | --- | --- | --- | --- |
| RK-8139 clearcoat | 200 | 200 | 200 | 200 | 200 |
| Self-assembled silica condensate 5 |  | 13 |  |  |  |
| Self-assembled silica condensate 6 |  |  | 16 |  |  |
| Self- |  |  |  | 24 |  |

TABLE 5-continued

|  | Control clearcoat 6 | Clearcoat 7 | Clearcoat 8 | Clearcoat 9 | Clearcoat 10 |
| --- | --- | --- | --- | --- | --- |
| assembled silica condensate 7 |  |  |  |  |  |
| Self-assembled silica condensate 8 |  |  |  |  | 24 |

Each of the above clearcoatings was hand sprayed to a coating thickness of about 50 microns onto separate steel panels coated with a waterborne black basecoat (under Dupont code of TW710 black, commercially available from DuPont) over a steel substrate which was already coated with a layer each of electro-coat and primer surfacer as described in the previous coating examples.

The basecoat and clearcoat were applied and baked according to the procedure described in coating example A.

All the samples were tested for crockmeter-dry and wet mar resistance by methods described in coating example A.

The data is summarized in Table 6.

TABLE 6

| Clearcoat Example | 20° Gloss | 2° Haze | Crockmeter - Dry Mar | Crockmeter - Wet Mar |
| --- | --- | --- | --- | --- |
| Control clearcoat 6 | 85 | 0.1 | 67% | 31% |
| Clearcoat 7 | 85 | 0.1 | 80% | 47% |
| Clearcoat 8 | 84 | 0.11 | 85% | 48% |
| Clearcoat 9 | 84 | 0.1 | 85% | 65% |
| Clearcoat10 | 84 | 0.1 | 86% | 68% |

Clearcoat examples 7 to 10 all showed significant improvement of crockemeter dry and wet mar resistance over control clearcoat 6, without significant loss of gloss or increase of haze.

Self-Assembled Silica Condensate Stability

Several examples and comparative examples were preformed to demonstrate the stability of various embodiments of the present disclosure.

Preparation Of Comparative Silicate Condensate A 40 grams of tetraethyl orthosilicate, 6.6 grams of deionized water and 0.36 grams of dodecylbenzene sulfonic acid were added to a flask with stirring. The mixture was stirred for several minutes until a clear solution was formed. The mixture was then stirred at 60° C. for 15 hours. White precipitation was formed.

This example shows that the hydrolysis of a tetralkyl orthosilicate results in the formation of a precipitate rather than a dispersed mixture. It is believed that the growth of the siloxane or silicate structural unit (Si—O—Si—O—) will be unlimited without the medium to long chain trialkoxy silane. This unlimited growth will ultimately lead to an infinite Mw and precipitation from the solution.

Preparation of Comparative Of Silane/Silicate Condensate B 6.5 grams of methyltrimethoxysilane, 40 grams of tetraethyl orthosilicate, 8.3 grams of deionized water and 0.36 grams of dodecylbenzene sulfonic acid were added to a flask with stirring. The mixture was stirred for several minutes until a clear solution was formed. The mixture was then stirred at 60° C. for 15 hours, then cooled to room temperature. The mixture was stored at room temperature for two weeks and a gel was noted to have formed.

This example shows that the selection of the chain length of the trialkoxy silane is important. In this case, the alkyl groups of the trialkoxy silane is a methyl group and the reaction product forms a gel after two weeks which is unacceptable.

Preparation of Self-Assembled Silica Condensate 9

6.8 grams of IPA-ST, 40 grams of tetraethyl orthosilicate, 8.3 grams of deionized water and 0.36 grams of dodecylbenzene sulfonic acid were added to a flask with stirring. The mixture was stirred for several minutes until a clear solution was formed. The mixture was then stirred at 60° C. for 15 hours, then cooled to room temperature. A clear solution with a blue tint was formed and was found to be stable at room temperature for at least 2 weeks.

Preparation of Self-Assembled Silica Condensate 10

30 grams of propyltrimethoxysilane, 19.1 grams of tetraethyl orthosilicate, 8.3 grams of deionized water and 0.36 grams of dodecylbenzene sulfonic acid were added to a flask with stirring. The mixture was stirred for several minutes until a clear solution was formed. The mixture was then stirred at 60° C. for 15 hours, then cooled to room temperature. A colorless clear solution was formed and was found to be stable at room temperature for at least 2 weeks.

Preparation of Self-Assembled Silica Condensate 11

30 grams of propyltrimethoxysilane, 19.1 grams of tetraethyl orthosilicate, 8.3 grams of deionized water and 0.36 grams of dodecylbenzene sulfonic acid were added to a flask with stirring. The mixture was stirred for several minutes until a clear solution was formed. The mixture was then stirred at 60° C. for 15 hours, then cooled to room temperature. 1.2 grams of trimethyl orthoacetate was added and the colorless clear solution was found to be stable at room temperature for at least 4 weeks.

What is claimed is:

1. A coating composition comprising:
A) a self-assembled silica condensate formed by the hydrolysis of a reaction mixture comprising a tetraalkoxy orthosilicate and at least two medium to long chain trialkoxy silanes having a structure according to formula (1):

wherein each R is independently an alkyl group having 1 to 4 carbon atoms and $R^1$ is an organic group comprising from 3 to 20 carbon atoms, wherein $R^1$ of at least one of said medium to long chain trialkoxy silanes is an alkyl group, and $R^1$ of at least one of said medium to long chain trialkoxy silanes is substituted with a functional group; and B) a film-forming binder comprising:
a crosslinkable component, wherein the crosslinkable component is a compound, oligomer and/or polymer comprising one or more functional groups selected from hydroxyl groups, amine groups, epoxy groups, carboxylic acid groups, anhydride groups, aspartate groups, acetoacetate groups, orthoester groups, and thiol groups; and
at least one crosslinking component comprising functional groups capable of reacting with the functional groups of the crosslinkable component to form a crosslinked network, wherein the crosslinking component is a melamine resin or a compound, oligomer and/or polymer comprising one or more of carboxylic acid groups, anhydride groups, isocyanate groups, blocked isocyanate groups or combinations thereof.

2. The coating composition of claim 1 wherein $R^1$ of at least one of said medium to long chain trialkoxy silanes is propyl trialkoxy silane and $R^1$ of at least one of said medium to long chain trialkoxy silanes is substituted with an epoxy functional group.

3. The coating composition of claim 1 wherein the crosslinkable component of the film-forming binder is a compound, oligomer and/or polymer containing epoxy functional groups and the crosslinking component of the film-forming binder is a compound, oligomer and/or polymer containing carboxylic acid groups.

4. The coating composition of claim 1 wherein said reaction mixture further comprises silane functional polymers.

5. The coating composition of claim 1 wherein the reaction mixture further comprises colloidal silica.

6. The coating composition of claim 1 wherein the functional group is epoxide, carbamate, urea, hydroxyl, vinyl or blocked isocyanate.

7. A coating composition comprising:
A) a self-assembled silica condensate formed by the hydrolysis of a reaction mixture comprising a silane functional polymer and a medium to long chain trialkoxy silane having a structure according to formula (2) or formula (3):

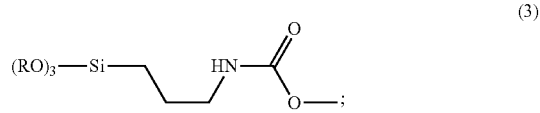

wherein, for either formula (2) or formula (3), each R is independently an alkyl group having 1 to 4 carbon atoms; and B) a film-forming binder comprising:
a crosslinkable component, wherein the crosslinkable component is a compound, oligomer and/or polymer comprising one or more functional groups selected from hydroxyl groups, amine groups, epoxy groups, carboxylic acid groups, anhydride groups, aspartate groups, acetoacetate groups, orthoester groups, and thiol groups; and
at least one crosslinking component comprising functional groups capable of reacting with the functional groups of the crosslinkable component to form a crosslinked network, wherein the crosslinking component is a melamine resin or a compound, oligomer and/or polymer comprising one or more of carboxylic acid groups, anhydride groups, isocyanate groups, blocked isocyanate groups or combinations thereof.

8. The coating composition of claim 7 wherein the silane functional polymer includes a hydrolysable silane functional group of the formula Si—X, wherein X is an alkoxy group having from 1 to 4 carbon atoms, an aryloxy group having from 6 to 20 carbon atoms, an acyloxy group having from 2 to 6 carbon atoms, hydrogen, halogen, hydroxy, amide, amide, imidazole, oxazolidinone, urea, carbamate or hydroxylamine.

9. The coating composition of claim 7 wherein the silane functional polymer includes a hydrolysable silane functional group of the formula Si—X, wherein X is an alkoxy group.

10. The coating composition of claim 7 wherein the silane functional polymer has a terminal end and includes a hydrolysable silane functional group at the terminal end.

11. The coating composition of claim 7 wherein the silane functional polymer includes a main polymer chain and includes a hydrolysable silane functional group in the main polymer chain.

12. The coating composition of claim 7 wherein the silane functional polymer includes a main polymer chain and includes a hydrolysable silane functional group pendant to the main polymer chain.

13. The coating composition of claim 7 wherein the medium to long chain trialkoxy silane has a structure according to formula (2):

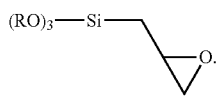 (2)

14. The coating composition of claim 7 wherein the medium to long chain trialkoxy silane has a structure according to formula (3):

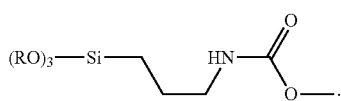 (3)

15. The coating composition of claim 7 wherein the reaction mixture further comprises colloidal silica.

16. The coating composition of claim 7 wherein the reaction mixture consists essentially of silane functional polymers and the medium to long chain trialkoxy silane.

17. The coating composition of claim 7 wherein the silane functional polymer also contains epoxide, acid, carbamate, urea, hydroxyl, or blocked isocyanate groups.

18. A coated substrate comprising at least one layer of a coating composition comprising:
A) a self-assembled silica condensate formed by the hydrolysis of a reaction mixture comprising a tetraalkoxy orthosilicate and at least two medium to long chain trialkoxy silanes having a structure according to formula (1):

wherein each R is independently an alkyl group having 1 to 4 carbon atoms and $R^1$ is an organic group comprising from 3 to 20 carbon atoms, wherein $R^1$ of at least one of said medium to long chain trialkoxy silanes is an alkyl group, and $R^1$ of at least one of said medium to long chain trialkoxy silanes is substituted with a functional group; and B) a film-forming binder comprising:
a crosslinkable component, wherein the crosslinkable component is a compound, oligomer and/or polymer comprising one or more functional groups selected from hydroxyl groups, amine groups, epoxy groups, carboxylic acid groups, anhydride groups, aspartate groups, acetoacetate groups, orthoester groups, and thiol groups; and
at least one crosslinking component comprising functional groups capable of reacting with the functional groups of the crosslinkable component to form a crosslinked network, wherein the crosslinking component is a melamine resin or a compound, oligomer and/or polymer comprising one or more of carboxylic acid groups, anhydride groups, isocyanate groups, blocked isocyanate groups or combinations thereof.

* * * * *